Nov. 23, 1965 E. G. GOEHLE 3,219,990

SPHERICAL TRANSDUCER FOR MAGNETIC TAPE RECORDING

Filed June 18, 1962

INVENTOR.
Earl G. Goehle
BY
Harness, Dickey & Pierce
ATTORNEYS.

United States Patent Office 3,219,990

Patented Nov. 23, 1965

3,219,990

SPHERICAL TRANSDUCER FOR MAGNETIC TAPE RECORDING

Earl G. Goehle, Grosse Pointe Shores, Mich., assignor, by mesne assignments, to Gay-Lee Company, a corporation of Michigan Filed June 18, 1962, Ser. No. 203,215
2 Claims. (Cl. 340—174.1)

This invention relates generally to magnetic transducers for sound recorders, telemetering systems, computers and the like, and more particularly to a novel tape recorder transducer that automatically controls the orientation of a magnetic tape passing thereover.

Magnetic recording systems ordinarily utilize a magnetic transducer having a magnetic circuit with a nonmagnetic gap therein over which a magnetic recording medium, for example, a magnetizable tape, passes. Suitable coils are orientated relative to the magnetic circuit to impress magnetic variations across the nonmagnetic gap which, in the case of recording, are picked up by the magnetic tape.

Often, the magnetizable tape is provided with a plurality of transversely spaced channels to maximize the capacity thereof to store intelligence. Generally, the channels are spaced perpendicularly to the direction of movement of the tape.

To achieve high-fidelity recording and reproduction, it is essential that the relationship of the transducer to the magnetic tape be precisely maintained at all times. This requirement is particularly important when a multiplicity of channels are employed.

Systems of the prior art have included means for manually adjusting the lateral and angular relationship of the magnetic tape to the transducer, none of which have proved to be entirely satisfactory. In such systems heretofore known and used, variations in, for example, magnetic tape tension, cause changes in the angle of contact pressure between the tape and the magnetic head, which in turn, results in skew of the tape or lateral displacement thereof relative to the head. Further, irregularities in the tape itself and/or in the tape drive mechanism may cause variations in the transverse or angular relationship of the tape to the transducer.

In accordance with the present invention, the moving tape is automatically aligned relative to the transducer so as to be continuously maintained in the proper lateral and angular alignment therewith. The tape is continuously biased into engagement with the transducer by an air cushion, complementary curved surfaces on the transducer and the impressed curvature of the tape automatically precluding any tendency of the tape to drift laterally of the transducer. Distortions, inaccuracies and attenuations of the reproduced signals due to lateral and angular disparities between the head and the magnetic medium are substantially eliminated.

Accordingly, one object of the instant invention is an improved magnetic transducer.

Another object is a magnetic transducer that automatically positions a recording medium relative thereto.

Another object of the present invention is a novel magnetic reproduction system wherein a moving tape is continuously adjusted relative to a magnetic transducer.

These and other objects of the present invention will become apparent from the following description, claims and drawings, wherein:

Figures 1, 2, 3, 4:
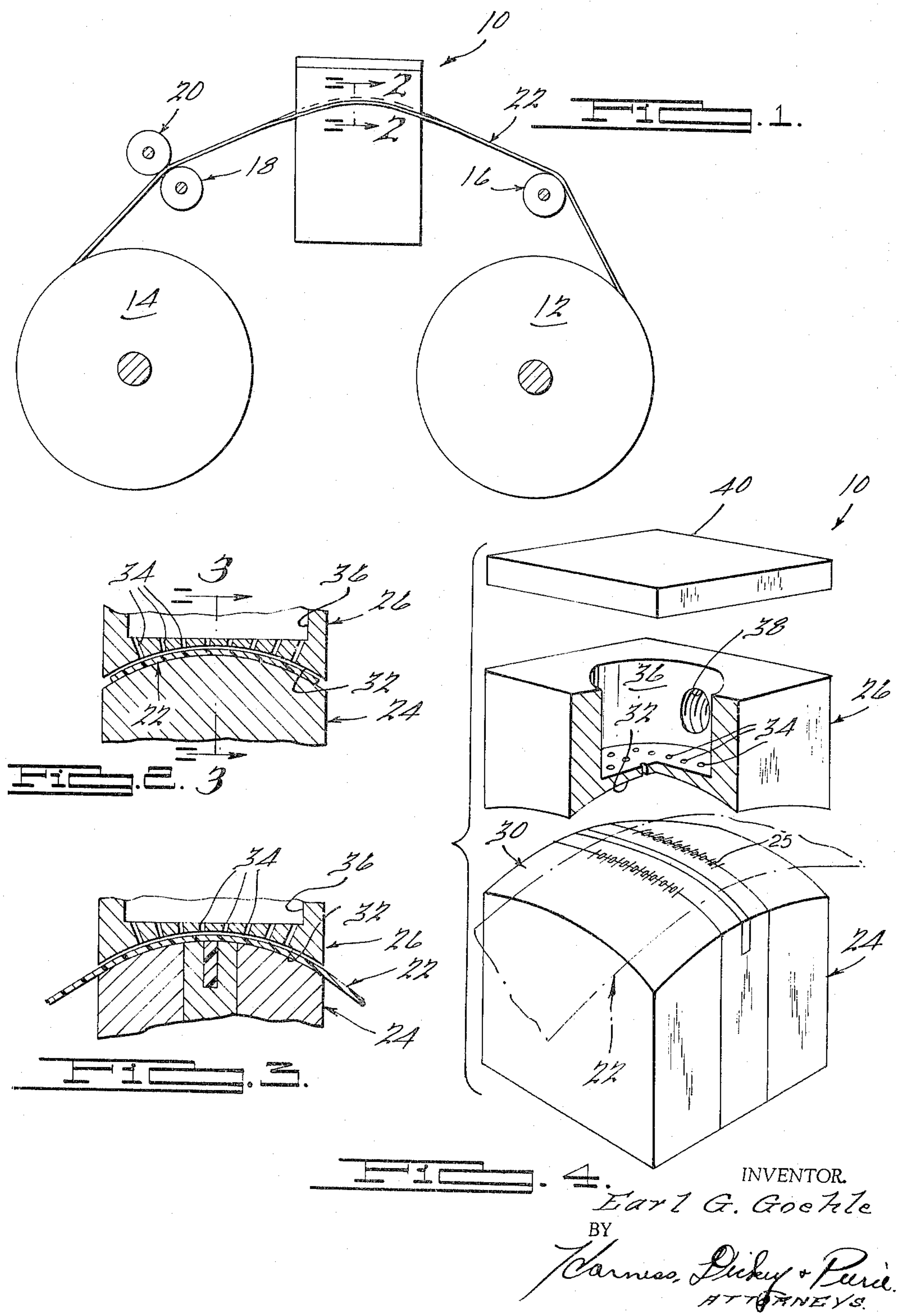
FIGURE 1 is a diagrammatic view of a magnetic recording system using the improved recording head of the instant invention.
FIG. 2 is a cross sectional view taken substantially along the line 2—2 of FIGURE 1.
FIG. 3 is a cross sectional view taken substantially along the line 3—3 of FIG. 2.
FIG. 4 is an exploded perspective view of the recording head in accordance with the instant invention.

A magnetic transducer 10, in accordance with an exemplary embodiment of the instant invention, is shown in diagrammatic association with a pair of reels 12 and 14, a pair of idler rolls 16 and 18, and a drive roll 20. A magnetic tape 22 extends from the reel 12 over the idler roll 16 through the transducer 10 between the idle and drive rolls 18 and 20, respectively, and onto the reel 14.

As best seen in FIG. 4, the transducer 10 comprises a mounting base 24 for the support of a plurality of conventional magnetic core elements 25 and a pressure pad 26. It is to be understood that the magnetic elements 25 of the transducer 10 are conventional in nature insofar as their electrical and magnetic characteristics are concerned, and are therefore not particularly described for the purpose of clarity.

The mounting base 24 accommodates sufficient magnetic elements 25 for the impression of, for example, eight channels of intelligence on the magnetic tape 22. It is understood that any number of such channels may be impressed on the tape 22 as desired. The pressure pad 26 is mounted in superimposed spaced relationship over the mounting base 24 to provide for the passage of the tape 22 therebetween.

In accordance with the instant invention, an upper end face 30 of the mounting base 24 comprises a spherical section having a radius complementary to the orientation of the reels 12 and 14 relative to the transducer 10. The tape 22 passes over the face 30 of the base 24 in intimate slidable engagement therewith.

To insure intimate contact between the lateral edges of the tape 22 and the laterally extended spherical surface 30 of the base 24, the pressure pad 26 has a concave spherical surface 32 complementary to the convex face 30 on the base 24. The surface 32 of the pad 26 is spaced from the surface 30 of the base 24 a distance equal to, for example, the thickness of the tape 22 plus .005 inch. If, for example, the tape 22 has a thickness of .008 inch, the face 32 of the pressure pad 26 is spaced from the face 30 of the base 24 by .013 inch.

The tape 22 is biased into intimate engagement with the face 30 of the base 24 by a cushion of air that flows downwardly through a plurality of apertures 34 in the pad 26 from an air chamber 36 therein. Air under pressure is conducted to the chamber 36 through an aperture 38 in the pad 26 from a suitable source (not shown). A cover plate 40 closes the chamber 36. Air flows through the apertures 34, thence both laterally and longitudinally over the top surface of the tape 22, creating an air cushion that biases the tape into intimate engagement with the convex spherical end face 30 of the base 24.

The tape 22 is precluded from lateral movement relative to the transducer 10 by an action analogous to centering of a belt by the crown on a pulley. Stated in another manner, the edge portions of the tape 22 are restrained from movement toward the center portion of the base 24 due to the center crown of the base 24. In this manner, lateral displacement and skew of the tape 22 relative to the base 24 of the transducer is minimized, resulting in relatively distortionless transcribing and reproduction of the magnetic intelligence thereon.

It is to be understood that the specific construction of the improved tape recorder transducer herein disclosed and described is presented for the purpose of explanation and illustration and is not intended to indicate limits of the invention, the scope of which is defined by the following claims.

What is claimed is:

1. In a tape recorder transducer, an improved means for minimizing lateral skew of the tape as it moves relative to the transducer comprising a base member having a convex generally spherical face thereon over which the tape passes, and a pressure pad disposed in spaced relation thereto, said pressure pad having means for the conduction of air under pressure toward the tape to bias the tape against the convex surface on said base member.

2. A tape recorder transducer comprising a base member for the support of a magnetizable element, said base member having a convex generally spherical face thereon for slidably supporting a magnetic tape, and a pressure pad having a concave generally spherical face complementary to the convex face on said base member disposed in spaced confronting relation thereto, said pressure pad having an air chamber and a plurality of apertures in the concave face thereof for conducting air under pressure from the chamber toward the tape to bias the tape against the convex surface of said base member.

References Cited by the Examiner

UNITED STATES PATENTS

| | | | |
|---|---|---|---|
| 2,962,200 | 11/1960 | Pouliart et al. | 179—100.2 |
| 2,984,398 | 5/1961 | Chalmers | 179—100.2 |
| 2,998,495 | 8/1961 | Maxey | 179—100.2 |

IRVING L. SRAGOW, *Primary Examiner.*